Dec. 11, 1951   R. B. SAALFRANK   2,578,265
BELLOWS PUMP
Filed Oct. 11, 1948   2 SHEETS—SHEET 1
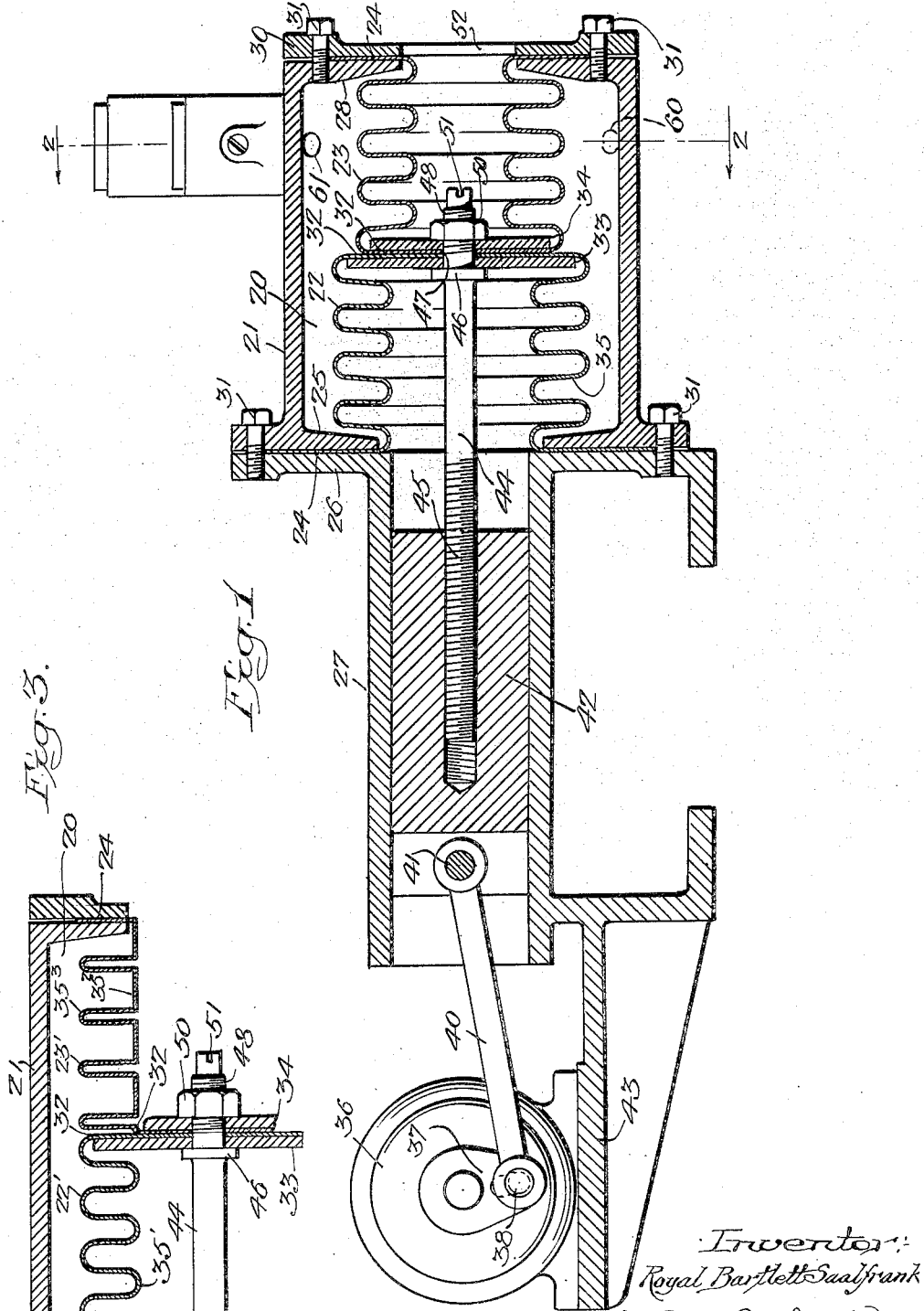
Inventor:
Royal Bartlett Saalfrank
Attorneys.

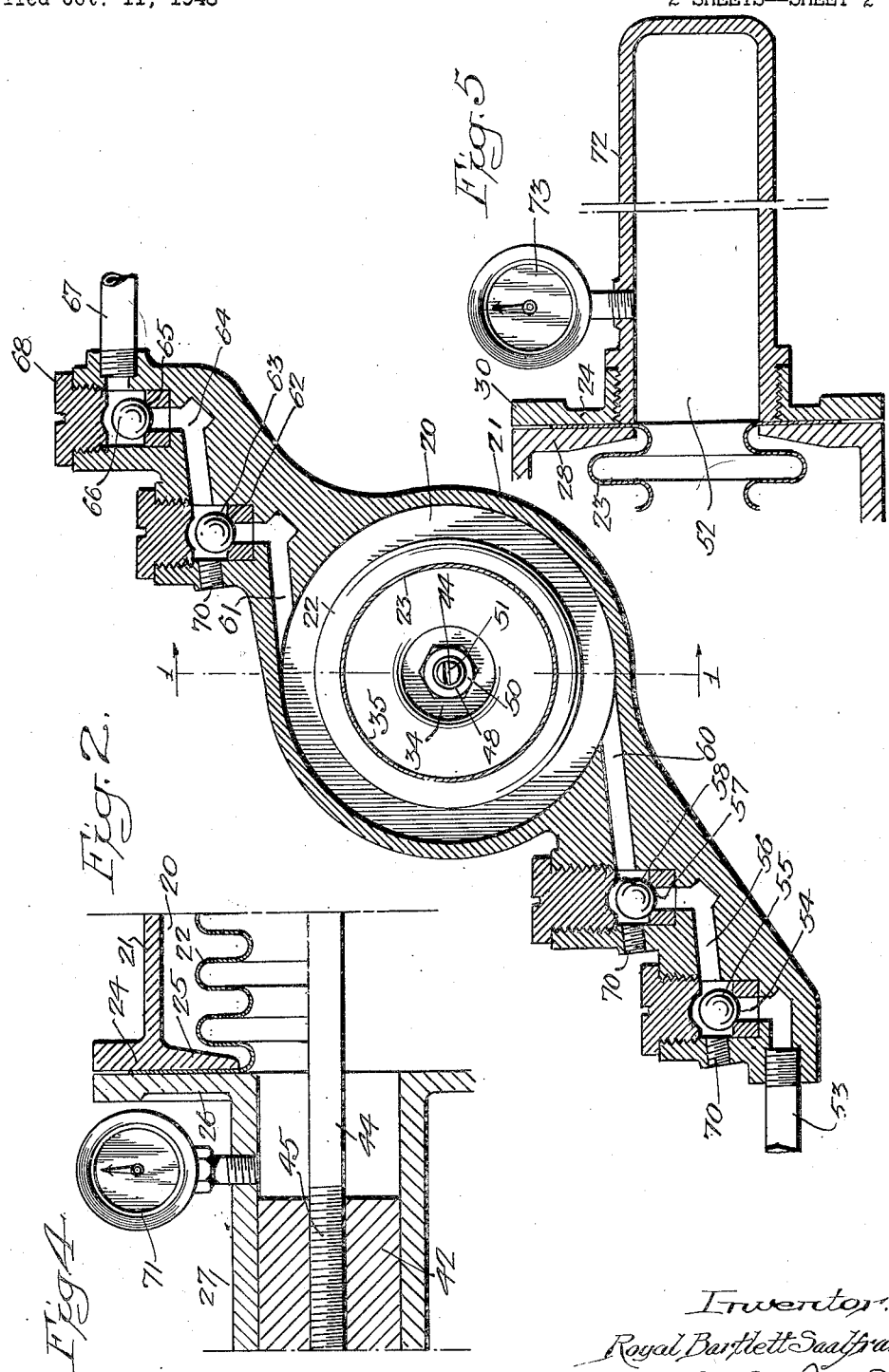

Patented Dec. 11, 1951

2,578,265

UNITED STATES PATENT OFFICE 2,578,265

BELLOWS PUMP

Royal Bartlett Saalfrank, Gulfport, Fla., assignor to Milton Roy Company, Springfield Township, Pa., a corporation of Pennsylvania Application October 11, 1948, Serial No. 53,953

7 Claims. (Cl. 103—152)

The present invention relates to bellows pumps.

A purpose of the invention is to permit the use of bellows pumps for accurate metering of liquids and particularly for metering of comparatively small quantities of liquids.

A further purpose is to avoid unduly short strokes when bellows pumps are employed for pumping small quantities of liquids.

A further purpose is to obtain a comparatively long pumping stroke on a bellows pump with a comparatively small delivery per stroke.

A further purpose is to construct a pump chamber which includes in its walls abutting bellows having different displacement characteristics and operated back and forth by a reciprocable operator moving in a direction to shorten one bellows and concurrently lengthen the other bellows on one stroke, and then to lengthen the one bellows and concurrently shorten the other bellows on the other stroke.

A further purpose is to employ cylindrical coaxial opposed bellows having different displacement characteristics.

A further purpose is to produce different displacement characteristics by difference in diameter of the bellows, by difference in volume change in the convolutions per unit change in length of the bellows or by a combination of such features.

A further purpose is to provide enclosed chambers for the bellows on the non-pumping faces individually or collectively, and to indicate leakages by change in pressure in such chambers.

A further purpose is to provide supplemental space beyond the space within the bellows in one of the bellows non-pumping chambers to minimize the extent of compression and expansion of included gas.

Further purposes appear in the specification and in the claims.

In the drawings I have chosen to illustrate a few only of the numerous embodiments in which my invention may appear, choosing the forms shown from the standpoints of convenience in illustration, satisfactory operation and clear demonstration of the principles involved.

Figure 1 is a central vertical section of a pump embodying the invention, the section being taken on the line 1—1 of Figure 2.

Figure 2 is a section of Figure 1 on the line 2—2.

Figure 3 is a fragmentary section corresponding to a portion of Figure 1, showing a variation in the bellows.

Figures 4 and 5 are fragments of Figure 1 showing modifications.

In the prior art bellows pumps have had only limited applicability to precision pumping where pumps are employed for metering of liquids to be used as chemical reactants, treating materials, additives or the like.

Efficient bellows construction usually dictates a diameter which is comparatively large compared to the piston or plunger diameter of many of the metering pumps commonly used, and if such bellows are applied to metering pumps of this character without special precautions in order to obtain the desired small volume of delivery per stroke, it is necessary to reduce the stroke correspondingly.

The very short strokes are highly inaccurate from the standpoint of metering of liquids. In the first place, lost motion, change in dimensions due to expansion and contraction, and other operating variables impose errors which become large in comparison to the total stroke. Thus the pump may not discharge the same quantity per stroke when it first starts up as when it has been operating for some time. Or the volume discharged per stroke may vary substantially over an extending period of use. In the second place, it is frequently desirable to adjust the stroke or the displacement, and where a very short stroke is used, any stroke adjustment becomes highly inaccurate, as a slight variation in stroke adjustment will impose a serious error.

By the present invention such difficulties are overcome, and it is possible to employ bellows of substantial diameter with long strokes and desirably small volumes discharged per stroke.

In accordance with the invention, a plurality of bellows are used, preferably two, disposed in such manner that on each pump stroke each bellows produces a different displacement. Thus one bellows on the pumping stroke will occupy more volume than the other bellows loses on the same stroke, while on the suction stroke one bellows loses more volume than the other bellows gains. Thus the combined effect of the two or more bellows is to reduce the volume of the pump chamber on the pumping stroke and to increase the volume of the pump chamber on the suction stroke.

It will be understood that the bellows may form any desired wall of the pump chamber, but for most purposes it will be convenient to have the bellows form the interior wall.

Considering Figures 1 and 2, a pump chamber 20 is provided in the space between an outer cylindrical stationary housing wall 21 and two interior abutting bellows 22 and 23. The bellows are suitably cylindrical and have open end flanges 24 which are suitably clamped. In the case of the bellows 22, the clamping is between an end wall 25 of the housing and a flange 26 of a pump crosshead guide 27. In the case of the bellows 23 the open end flange 24 is clamped between an end 28 of the housing and a locking ring 30. Suitable clamping bolts 31 are provided.

The abutting ends of the bellows comprise heads 32 which are desirably rigid and adjoin one another and are suitably clamped between clamping plates 33 and 34. The clamping plates may be free from or secured to the respective bellows heads, and in one commercial form of bellows produced by welding individual elements, the clamping plates may be effectively portions of the heads of the bellows.

Each bellows has suitable resilient annular convolutions 35 formed in any suitable way, as by cold working the bellows tube or welding together the individual walls of the convolutions, as well known in the art. The present invention in its broader aspects is not concerned with the detail of the manner of constructing the bellows. The bellows may be of any suitable material having high fatigue properties, the preferred materials being beryllium copper, phosphor bronze or stainless steel. In some installations elastomers such as natural rubber or synthetic rubber may be used for bellows. Suitable synthetic rubbers are Buna S, Buna N, polychloroprene (neoprene) and Thiokol.

As shown best in Figure 1, the bellows are preferably placed in coaxial opposed relationship, so that motion of the head of one bellows in the direction of the axis to lengthen that bellows will concurrently shorten the other bellows.

Any suitable means may be employed for reciprocating the bellows. The conventional illustration shows an electric motor 36 driving a crank 37, whose crank pin 38 adjustably pivotally connects to a conencting rod 40, making pivotal connection at 41 to a crosshead 42, which slides back and forth in the crosshead guides 27. The motor is desirably supported on a frame bracket 43.

The crosshead connects to the heads of the bellows by a plunger 44, which is adjustable with respect to the crosshead by virtue of a screw 45. A shoulder 46 on the plunger engages behind the clamping plate 33 while the plunger passes through openings at 47 in the clamping plates and heads of the bellows. Beyond the clamping plate 34 the plunger is threaded at 48 and receives a nut 50 which holds the heads and clamping plates together. A screw driver slot 51 accessible through an opening 52 in the housing is provided to permit adjusting the screw at 45 once the nut 50 is loosened. In this way the displacement limits of the device can be changed.

Stroke is changed by adjusting the crank arm by moving the pin 38 in the slot. If it desired to use automatic stroke changing, this can be accomplished in accordance with the principles set forth in Milton Roy Sheen U. S. patent application Serial No. 654,180, filed March 13, 1946 for Stroke Control Mechanism, now abandoned, incorporated herein by reference.

The motor 36 may, if desired, be a variable speed type, either direct or alternating current. For alternating current use, the motor may, if desired, be a direct current type incorporating a rectifier, suitably of the electronic type, such as a Thy-Mo-Trol.

The valves may be of any suitable character and valves have been conventionally illustrated, for example as in Milton Roy Sheen U. S. Patents Nos. 2,263,429, granted November 18, 1941 and 2,367,893, granted January 23, 1945.

As best seen in Figure 2, two valves in series are preferably provided on inlet and two valves in series are likewise provided on discharge. Inlet at 53 feeds to the seat 54 of a valve 55 suitably of ball type and from thence a connecting passage 56 extends to the seat 57 of a second valve 58, preferably of ball type. From the valve 58 the inlet liquid passes through an intake port 60 of the chamber of the pump. The liquid pumped passes from the pumper chamber through a discharge port 61 to the seat 62 of a valve 63, suitably of ball type, and thence through a connecting passage 64 to a seat 65 of a valve 66, suitably of ball type. From the valve 66, the discharge leaves the pump at 67. Removable caps 68 limit the motion of the balls of the valves and plugs 70 close drill holes. The various passages 56, 60, 61 and 64 are desirably made sloping so as to avoid trapping air.

In order to assure that the respective bellows will have different displacement characteristics, it is preferable to make the bellows of different diameters. Thus in the form shown in Figures 1 and 2, the bellows 23 is small and the bellows 22 is large. On the pumping stroke, that is as the left-hand bellows in Figure 1 lengthens and the right-hand bellows in Figure 1 shortens, the smaller right-hand bellows leaves space, but the left hand larger bellow occupies greater space. If the volume change in the convolutions per unit change in length of the two bellows is the same, the effective pumping volume is the annular area corresponding to the difference in diameters between the two bellows multiplied by the distance of the stroke. In effect this equals the head area of the larger belows minus the head area of the small bellows times the stroke.

Thus in operation of the form of Figures 1 and 2, the plunger will be adjusted to the desired stroke, and the pump will be started in the usual manner. Notwithstanding that there is a considerable stroke, the volume discharged by the pump will be small and error in lost motion or the like will have little effect in causing variations in discharge. In case it is desired to change the delivery of the pump, this can be accomplished by changing the speed of the drive or by adjusting the stroke.

The various bellows may be employed with different displacement characteristics in the convolutions without necessarily having a difference in diameters. To illustrate this feature I show in Figure 3 two bellows 22' and 23'. The bellows 22' has convolutions 35' which are uniform throughout, while the bellows 23' has convolutions $35^2$ and $35^3$ which differ markedly between the shape and spacing of the outwardly directed bends and the shape and spacing of the inwardly directed bends. Thus the two bellows do not have the same volume changes in the convolutions per unit change in length on compression or extension, and the difference in the convolutions will cause a slight relative volume decrease on the pumping stroke and volume increase on the suction stroke. This feature may be taken advantage of where very minute deliveries are required with a large stroke, permitting very accurate discharge of as little as a few cubic centimeters per day by the pump. It will be understood, of course, that any combination may be used of the feature of difference in diameter and difference in character of convolutions.

In operation the form of Figure 3 is effectively the same as that of Figures 1 and 2.

It will be evident that the invention has all the advantages of a usual bellows pump, particularly by eliminating a stuffing box and eliminating problems of lubrication, while at the same time it overcomes the most serious disadvantages by permitting a very large stroke. It will, of course, be understood that if it is desired to employ a longer stroke it is merely necessary to select two bellows which, by reason of closely similar diameters or closely similar characters of convolutions, have displacement characteristics which are almost but not quite the same. By this procedure the length of the stroke can be increased as much as desired.

In many cases, particularly where the pump is being located at inaccessible points or under water or beneath another liquid, it is very desirable to provide some means of indicating the failure of a bellows. Likewise it is desirable to confine any of the medium pumped which may reach a non-pumping surface of the bellows in case of leakage. It is likewise desirable, particularly when the pump is to be located beneath the surface of a liquid, as in a sump, to provide adequate capacity in one of the chambers so that gas will not constantly require compression and expansion during pumping.

As shown in Figures 4 and 5, the interior space within the bellows 22 is connected to a pressure gage 71 which indicates a change in pressure due to leakage of the bellows 22. As shown in Figure 5, in this form the opening 52 is closed by a tubular reservoir 72, which preferably has a volume which is great with respect to that of the change of volume of the interior of the bellows 23 between the extremes of its pumping stroke (desirably more than 100 times such change of volume), and which is provided with a pressure gage 73. Thus in case the bellows 23 fails the pressure gage will indicate that fact and the wall of the reservoir will confine the liquid pumped. It will be understood that in case the pump is mounted at an inaccessible point, the pressure gages may be of the remote indicating type.

In view of my invention and disclosure variations and modifications to meet individual whim or particular need will doubtless become evident to those skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent:

1. In a pump, walls forming a pump chamber in actual contact with fluid being pumped, having an inlet and an outlet and including in the walls forming one side of the pump chamber a plurality of bellows having different displacement characteristics, inlet and outlet valves respectively in the inlet and outlet, and operating means reciprocable back and forth in a direction to shorten one bellows and concurrently lengthen another bellows, and then to lengthen the one bellows and concurrently shorten the other bellows and operatively connected to the respective bellows.

2. In a pump, walls forming a pump chamber in actual contact with fluid being pumped, having an inlet and an outlet and including in the walls forming one side of the pump chamber a plurality of bellows having different diameters, inlet and outlet valves respectively in the inlet and outlet, and operating means reciprocable back and forth in a direction to shorten one bellows and concurrently lengthen another bellows and then to lengthen the one bellows and concurrently shorten the other bellows and operatively connected to the respective bellows.

3. In a pump, walls forming a pump chamber in actual contact with fluid being pumped, having an inlet and an outlet and including in the walls forming one side of the pump chamber a plurality of bellows having different volume changes in the convolutions per unit change in length, inlet and outlet valves respectively in the inlet and outlet, and an operator reciprocable back and forth in a direction to shorten one bellows and concurrently lengthen another bellows and then to lengthen the one bellows and concurrently shorten the other bellows and operatively connected to the respective bellows.

4. In a pump, walls forming a pump chamber in actual contact with fluid being pumped, having an inlet and an outlet, and including in the walls forming the inside of the pump chamber a pair of cylindrical coaxial opposed bellows having different displacement characteristics, inlet and outlet valves respectively in the inlet and outlet, and an operator reciprocable back and forth in the direction of the axis to shorten one bellows while lengthening the other and connected to the bellows at the opposed ends.

5. In a pump, walls forming a pump chamber in actual contact with fluid being pumped, having an inlet and an outlet end including in the walls on the inside at the pump chamber a pair of cylindrical coaxial opposed bellows having different volume changes in the convolutions per unit change in length, inlet and outlet valves respectively in the inlet and outlet, and an operator reciprocable back and forth in the direction of the axis to shorten one bellows while lengthening the other and connected to the bellows at the opposed ends.

6. In a pump, walls forming a chamber in actual contact with fluid being pumped, having an inlet and an outlet and including in the walls forming one side of the pump chamber a plurality of bellows having different displacement characteristics, inlet and outlet valves respectively in the inlet and outlet, operating means reciprocable back and forth in the direction to shorten one bellows and concurrently lengthen another bellows, and then to lengthen the one bellows and concurrently shorten the other bellows and operatively connected to the respective bellows, walls forming a confining chamber on the opposite side of the bellows from the pump chamber and including a non-pumping surface of the bellows, and means to indicate leakage from the pumping surface to the non-pumping surface of the bellows.

7. In a pump, walls forming a pump chamber in actual contact with fluid being pumped, having an inlet and an outlet and including in the walls forming the pump chamber a plurality of bellows having different displacement characteristics, inlet and outlet valves respectively in the inlet and outlet, operating means reciprocable back and forth to shorten one bellows and concurrently lengthen another bellows and then to lengthen the one bellows and concurrently shorten the other bellows and operatively connected to the respective bellows, and walls connected to the bellows on the non-pumping surface to form an enclosure having a volume which is great compared to the change in volume of the enclosure in the course of pumping, whereby the enclosure will confine the fluid in case of leakage without appreciably increasing the work done in pumping.

ROYAL BARTLETT SAALFRANK.

REFERENCES CITED

The following references are of record in the file of this patent:

UNITED STATES PATENTS

| Number | Name | Date |
|---|---|---|
| | Whitfield | June 2, 1836 |
| 1,697,852 | Coursen | Jan. 8, 1929 |
| 2,229,715 | Zimmermann | Jan. 28, 1941 |
| 2,263,429 | Sheen | Nov. 18, 1941 |
| 2,367,893 | Sheen | Jan. 23, 1945 |